(12) United States Patent
Garg et al.

(10) Patent No.: US 11,366,833 B2
(45) Date of Patent: Jun. 21, 2022

(54) AUGMENTING PROJECT DATA WITH SEARCHABLE METADATA FOR FACILITATING PROJECT QUERIES

(71) Applicant: Adobe Inc., San Jose, CA (US)

(72) Inventors: Saurabh Garg, New Delhi (IN); Shubhi Rastogi, Noida (IN); Shiladitya Bose, Noida (IN); Hyder Ziaee, Hyderabad (IN); Hina Watts, Malout (IN)

(73) Assignee: ADOBE INC., San Jose, CA (US)

( * ) Notice: Subject to any disclaimer, the term of this patent is extended or adjusted under 35 U.S.C. 154(b) by 161 days.

(21) Appl. No.: 16/143,038

(22) Filed: Sep. 26, 2018

(65) Prior Publication Data

US 2020/0097595 A1    Mar. 26, 2020

(51) Int. Cl.
*G06F 16/28* (2019.01)
*G06F 16/245* (2019.01)
*H04B 1/06* (2006.01)

(52) U.S. Cl.
CPC .......... *G06F 16/285* (2019.01); *G06F 16/245* (2019.01); *H04B 1/06* (2013.01)

(58) Field of Classification Search
CPC ........ G06F 16/285; G06F 16/245; H04B 1/06
See application file for complete search history.

(56) References Cited

U.S. PATENT DOCUMENTS

| 2005/0131847 | A1* | 6/2005 | Weston | G06K 9/623 |
| | | | | 706/12 |
| 2012/0005242 | A1* | 1/2012 | Feng | G06Q 10/0639 |
| | | | | 707/805 |
| 2013/0152039 | A1* | 6/2013 | Kemmler | G06Q 10/06 |
| | | | | 717/101 |
| 2013/0318051 | A1* | 11/2013 | Kumar | G06F 16/1748 |
| | | | | 707/692 |
| 2016/0350283 | A1* | 12/2016 | Carus | G06F 40/30 |
| 2017/0132539 | A1* | 5/2017 | Ray | G06Q 10/0635 |
| 2018/0300865 | A1* | 10/2018 | Weiss | G06T 7/001 |

\* cited by examiner

*Primary Examiner* — Ashish Thomas
*Assistant Examiner* — Dustin D Eyers
(74) *Attorney, Agent, or Firm* — Kilpatrick Townsend & Stockton LLP

(57) ABSTRACT

Certain embodiments involve augmenting project data with searchable metadata for facilitating project queries. A method includes receiving metadata of the set of projects and identifying a filter within the metadata. The method also includes generating a first vector representing a first project of the set of projects and generating a second vector representing a second project of the set of projects. Further, the method includes grouping the first vector and the second vector into a project cluster based on the first vector and the second vector being within a threshold distance. The project cluster represents a set of filters associated with a subset of projects. Additionally, the method includes assigning a searchable tag to the project cluster based on the filter being a majority filter of the project cluster. The searchable tag includes metadata that facilitates locating the projects responsive to a query to the set of projects.

18 Claims, 7 Drawing Sheets

AUGMENTING PROJECT DATA WITH SEARCHABLE METADATA FOR FACILITATING PROJECT QUERIES

TECHNICAL FIELD

This disclosure relates generally to methods that interrelate objects in a data structure to facilitate retrieval of the data objects in response to a query. More specifically, but not by way of limitation, this disclosure relates to automatically assigning searchable metadata to project clusters that are clustered and tagged based on identification of filters located in project metadata.

BACKGROUND

Data analysis projects are used for analyzing large amounts of data and presenting the analysis in a usable size and format for a user. In one example, the data analysis projects analyze large amounts of data using one or more filters to narrow the size and scope of the data. A company may use sets of data analysis projects to identify trends of customers.

Existing interfaces for data analysis projects rely on users to manually identify searchable tags for the individual data analysis projects. The searchable tags assigned to the data analysis projects provide search terms for future users looking to interrelate data analysis projects within a data structure to facilitate retrieval of the data objects in response to a query and to avoid repeating tasks associated with the data analysis projects. For example, the user may assign the searchable tags to the data analysis projects based on words or terms related to results of the data analysis project.

A reliance on user input is often met with searchable tags assigned to the data analysis projects that are too nuanced to effectively facilitate retrieval of the data analysis projects. Alternatively, the user may forego tagging the data analysis projects with a searchable tag altogether. In either instance, the searchable tags of the data analysis projects provide little or no value to future users looking to capitalize on previously performed data analysis projects. For example, the future users may search for tags associated with a specific query. If the searchable tags assigned to the data analysis projects fail to provide any relevant information about the data analysis projects, such a search from the future user will fail to produce a number of potentially relevant data analysis projects.

SUMMARY

Certain embodiments involve augmenting project data with searchable metadata for facilitating project queries. For example, a method for augmenting project data includes one or more processing devices performing operations. The operations include receiving metadata of the set of projects and identifying a filter within the metadata. The operations also include generating a first vector representing a first project of the set of projects being associated with the filter and a second vector representing a second project of the set of projects being associated with the filter. Additionally, the operations include grouping the first vector and the second vector into a project cluster based on the first vector and the second vector being within a threshold distance. In the example, the project cluster represents a set of filters associated with a subset of projects and includes the filter. Further, the operations include assigning a searchable tag to the project cluster based on the filter being a majority filter represented in the project cluster. The searchable tag includes metadata that facilitates locating one or more of the first project and the second project responsive to a query to the set of projects.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
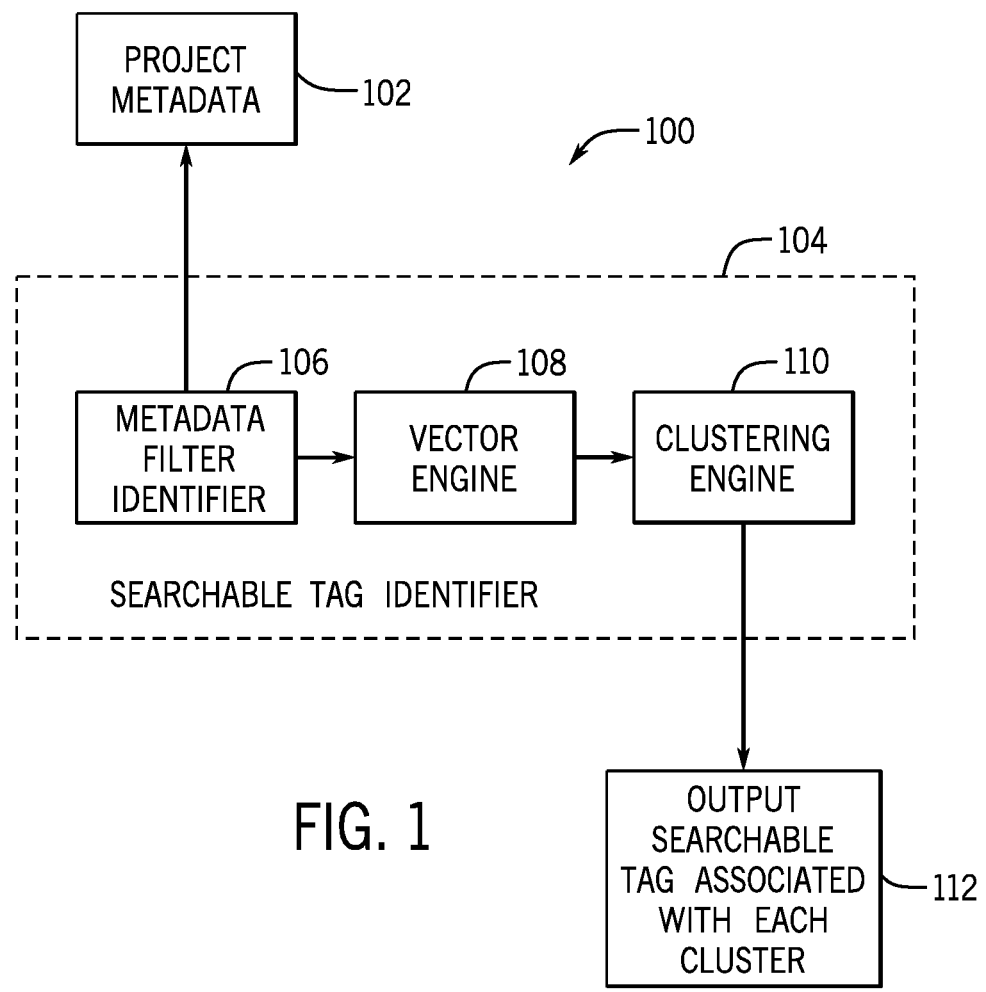
FIG. 1 depicts an example of a computing environment for generating a searchable tag of a cluster of projects, according to certain embodiments of the present disclosure.

Certain embodiments involve automatically assigning searchable metadata to project clusters that are clustered and tagged based on identification of filters located in project metadata. As explained above, conventional solutions for tagging data analysis projects with searchable tags (i.e., searchable metadata) involve users manually identifying searchable tags for individual data analysis projects. Because manual tagging of data analysis projects involves user identification and input, the data analysis projects often go untagged or are tagged with a word or term that is too nuanced for use by a subsequent user. Certain embodiments described herein address this issue by, for example, automatically identifying and assigning searchable tags for the data analysis projects. For instance, a searchable tag identifier module described herein identifies filters located in metadata of the data analysis projects, and segments the data analysis projects into clusters based on the identified filters. By clustering similar data analysis projects, the searchable tag identifier automatically assigns one or more searchable tags to sets of data analysis projects within the clusters to improve searchable tag assignment rates and relevance as compared to certain conventional solutions described above. In an example, assigning the searchable tags to the clusters of data analysis projects enables interrelation of objects in a data structure to facilitate retrieval of the data objects in response to a query.

The following non-limiting example is provided to introduce certain embodiments. In this example, a data analysis system having one or more processing devices executes a searchable tag identifier module to assign searchable tags to data analysis projects based on metadata of the data analysis projects. The data analysis system receives metadata associated with a set of data analysis projects. An example of a data analysis project is a set of data that has undergone a filtering process. In an embodiment, the filtering process filters raw data into a filtered data analysis project that is usable for subsequent analysis. The filtered data analysis project includes metadata that identifies filters used in the filtering process to generate the filtered data analysis project.

A metadata filter identifier of the searchable tag identifier module identifies a set of filters within the metadata. In an example, the metadata filter identifier identifies a filter format defining the filters included in the metadata, and the metadata filter identifier locates the filters and filter levels used for the data analysis project based on the identified filter format. An example of a filter is a logic statement that removes all data entries from a data analysis project originating from a country other than the United States (e.g., "location-US"). Another example of a filter is a logic statement that removes all data entries from the data analysis project unrelated to sales of a product to a specified consumer gender (e.g., "gender-woman"). The filter levels refer to ordered positions of the filters in a chain of filters used to generate the data analysis project. In an embodiment, the ordered positions of the filters are referred to nested filter layers. For example, removing all data entries originating from a country other than the United States is a first level filter, and subsequently removing all data entries unrelated to a specified consumer gender is a second level filter. Using the filters and the filter levels located in the metadata of the data analysis projects, a vector engine of the searchable tag identifier module generates a set of vectors. In an example, each data analysis project from the set of data analysis projects includes its own vector in the set of vectors. Further, each vector of the set of vectors identifies the filters and the filter levels used in the data analysis projects associated with each vector.

Continuing with this example, a clustering engine of the searchable tag identifier module groups the set of vectors to identify a plurality of project clusters. In an example, the plurality of project clusters are based on a k-means clustering operation that segments the plurality of data analysis projects into the clusters. The k-means clustering operation groups the vectors into project clusters based on distances of the vectors from cluster centers of individual project clusters. The clustering operation is based on the identified filters and filter levels stored within the vectors of the plurality of data analysis projects. The data analysis projects that include filters and filter levels that are the most similar are clustered together into a project cluster. In an example, the project clusters that include too few data analysis projects or a skewness value that is too high are discarded from further use by the searchable tag identifier module. When all of the project clusters of the set of data analysis projects are established, the searchable tag identifier module assigns a searchable tag to each project cluster based on a majority filter represented in each of the project clusters.

As used herein, the term "data analysis project" is used to refer to any set of data that is filtered using one or more filters into a set of data that is a usable size and format for a user. In an example, the data analysis project includes a metadata component that identifies the one or more filters used to filter the set of data.

As used herein, the term "filter" is used to refer to a logical operation that removes specified data from a set of data. In an example, the filter may remove data originating from a certain geographical region, data unrelated to a specified product, data associated with a specified gender of consumers, or any data associated with any other identifiable factor.

As used herein, the term "searchable tag identifier module" is used to refer to one or more applications, online services, or combinations thereof that include tools for analyzing data analysis projects, grouping similar data analysis projects, and assigning searchable tags to the grouped data analysis projects. The assigned searchable tags are based on filters used to generate filtered data of the data analysis projects within clusters of data analysis projects.

As used herein, the term "treemap" is used to refer to a visualization of clusters of data analysis projects associated with a project corpus (i.e., a set of data analysis projects). The visualization includes an indication of the searchable tags assigned to the clusters of data analysis projects and a visual indication of a number of data analysis projects within a cluster in relation to a number of data analysis projects included within other clusters.

Certain embodiments described herein facilitate locating one or more data analysis projects responsive to a query provided to a set of projects. Searchable tags assigned to project clusters interrelate the data analysis projects in a data structure to facilitate retrieval of the data analysis projects in response to receipt of the query. In particular, the automatic assignment of searchable tags to the project clusters improves a way that a computer is able to store the data analysis projects in a memory and to retrieve the data analysis projects from the memory.

Example of an Operating Environment for Grouping Data Analysis Projects and Assigning Searchable Tags Referring now to the drawings, FIG. 1 depicts an example of a computing environment 100 for assigning searchable tags to project clusters based on project metadata 102 received by the computing environment 100. The computing environment 100 includes a searchable tag identifier module 104, which is executed by one or more computing devices. The searchable tag identifier module 104 includes a metadata filter identifier 106, a vector engine 108, and a clustering engine 110.

The metadata filter identifier 106 receives the project metadata 102. The project metadata 102 provides an indication of how the data analysis project results were obtained, and the project metadata 102 includes the metadata for an entire set of data analysis projects (e.g., a corpus of data analysis projects). For example, the project metadata 102 includes an indication of filters used to generate the data analysis project results and filter levels at which the filters were applied (e.g., when the data analysis project includes a chain of nested filters). Upon receipt of the project metadata 102, the metadata filter identifier 106 identifies a format of the filters located within the project metadata 102. Using the identified format of the filters, the metadata filter identifier 106 is able to identify the actual filters included in the project metadata 102.

Information associated with the identified filters of the project metadata 102 is provided to the vector engine 108 of the searchable tag identifier module 104. In an example, the vector engine 108 generates a set of vectors that include the filter information for the data analysis projects. Each vector generated by the vector engine 108 corresponds to an individual data analysis project. The vectors include the information about the filter and information about the filter levels at which the filters are applied. In another embodiment, the vectors include information about the filter without also including the filter level information.

In one example, the searchable tag identifier module 104 applies the set of vectors to the clustering engine 110. The clustering engine 110 performs a clustering operation on the vectors to group the data analysis projects, as represented by their respective vectors, into project clusters. In an example, the clustering operation is a k-means clustering operation. Other suitable clustering operations are also contemplated. The clustering engine 110 groups the data analysis projects into the project clusters based on a distance from centers of the project clusters to the vectors associated with the data analysis projects. That is, the data analysis projects are grouped into a project cluster that has a center closest to the associated vector of the data analysis project.

When the data analysis projects are assigned to their respective project clusters, the searchable tag identifier module 104 assigns a searchable tag to each of the project clusters based on a majority filter identified in each of the project clusters. For example, if a project cluster includes a majority of data analysis projects using a filter 'A' at an important filter level, then the identified majority filter will be the filter 'A.' In such an example, the searchable tag identifier module 104 outputs a searchable tag at block 112 for the project cluster that is associated with the filter 'A.' Such a majority filter determination and searchable tag assignment is performed for each of the project clusters identified by the clustering engine 110. In one or more embodiments, each of the data analysis projects are individually assigned the searchable tag associated with the project cluster in which the data analysis project is grouped.

Further, the searchable tags associated with the project clusters or the data analysis projects are stored in a memory device, and the searchable tag facilitates retrieval of the data analysis projects when a relevant search query is provided at a user interface. The retrieved data analysis projects are provided based on relevance of the searchable tag to the search query. Using the data analysis projects that have already been generated enables future users to avoid redundancies in generating new data analysis projects for future purposes.

Examples of Determining and Assigning a Searchable Tag

Figure 2:
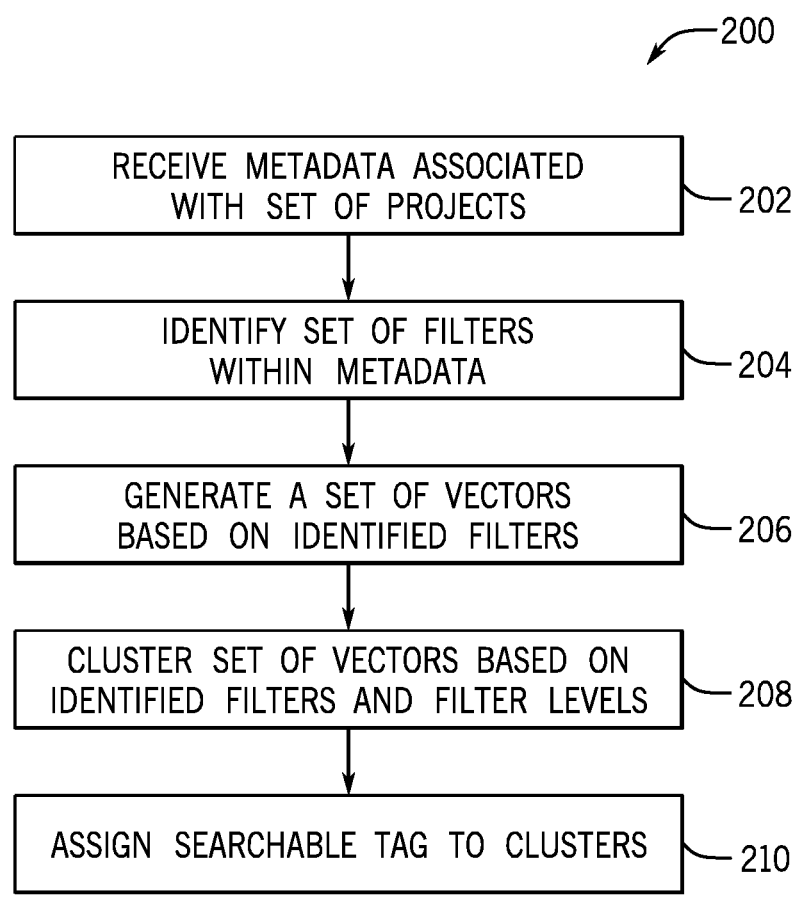
FIG. 2 depicts an example of a process for assigning searchable tags for project clusters, according to certain embodiments of the present disclosure.

FIG. 2 depicts an example of a process 200 for determining and assigning searchable tags to project clusters based on the project metadata 102. One or more processing devices implement operations depicted in FIG. 2 by executing suitable program code (e.g., the searchable tag identifier module 104). For illustrative purposes, the process 200 is described with reference to certain examples depicted in the figures. Other implementations, however, are possible.

At block 202, the process 200 involves receiving the project metadata 102 associated with a set of data analysis projects. One or more processing devices execute the searchable tag identifier module 104 (or suitable other program code) to implement block 202. For instance, executing the searchable tag identifier module 104 causes one or more processing devices to receive or otherwise access the project metadata 102 that is stored in a non-transitory computer-readable medium. In some embodiments, receiving or accessing the project metadata 102 involves communicating, via a data bus, suitable signals between a local non-transitory computer-readable medium and the processing device. In additional or alternative embodiments, receiving or accessing the project metadata 102 involves communicating, via a data network, suitable signals between a computing system that includes the non-transitory computer-readable medium and a computing system that includes the processing device.

An example of a data analysis project is a set of data that has undergone a filtering process. In an embodiment, the filtering process filters raw data into a filtered data analysis project that is usable for subsequent analysis. The filtered data analysis project includes metadata that identifies filters used in the filtering process. In an example, the metadata is located in an Extensible Markup Language (XML) format, a JavaScript Object Notation (JSON) format, or any other data format that includes a metadata portion.

At block 204, the process 200 involves identifying a set of filters within the project metadata 102. One or more processing devices execute the metadata filter identifier 106 of the searchable tag identifier module 104 (or other suitable program code) to implement block 204. In an example, each of the data analysis projects associated with the project metadata 102 includes one or more filters used to generate the data analysis projects. The metadata filter identifier 106 identifies a filter format or structure from the project metadata 102. The metadata filter identifier 106 uses the identified filter format or structure to locate the filters and filter levels used by the data analysis projects. A filter used in a data analysis project is a logic statement that removes all data entries from the data analysis project that do not fall within a specified filter category. In an example, one filter of a data analysis project includes a logic statement that removes all data entries from the data analysis project originating from a country other than the United States, and another filter of the data analysis project includes a logic statement that removes all data entries unrelated to a consumer of a specific gender. These filters are described as an example only, and the use of other filters to generate the data analysis projects is also contemplated.

The metadata filter identifier 106 also identifies filter levels at which the identified filters are applied within the data analysis project associated with the project metadata 102. The filter levels refer to ordered positions of the filters in a chain of nested filters used to generate the data analysis project. In the example above, removing all data entries originating from a country other than the United States is a first level filter, and subsequently removing all data entries unrelated to a consumer of a specified gender is a second level filter.

At block 206, the process 200 involves generating a set of vectors based on the identified filters. One or more processing devices execute the vector engine 108 of the searchable tag identifier module 104 (or other suitable program code) to implement block 206. Using the filters and the filter levels located in the metadata of the data analysis projects, the vector engine 108 is able to generate a set of vectors. In an example, each data analysis project from the set of data analysis projects includes its own vector in the set of vectors. Further, each vector of the set of vectors identifies the filters and the filter levels used in the data analysis projects associated with each vector.

In an example, the vectors are generated using one hot encoding of the set of filters identified in the project metadata 102. That is, each of the filters identified in the project metadata are assigned a one hot encoding value. When generating the set of vectors, the filters associated with the vectors are populated in the vectors as one hot encoded values. Further, the order of the filters populated in the vectors is based on a filter level of the filters within the associated data analysis project. In another embodiment, the filter level of the filter is assigned to each filter identified in the vector as part of the one hot encoding value or other encoding value of the filter.

At block 208, the process 200 involves clustering the set of vectors based on the identified filters and filter levels populated within the vectors. One or more processing devices execute the clustering engine 110 of the searchable tag identifier module 104 (or other suitable program code) to implement block 208. In an example, a plurality of project clusters are generated based on a k-means clustering operation that segments and groups the plurality of data analysis projects into the clusters. The k-means clustering operation groups the vectors into project clusters based on distances of the vectors from cluster centers of individual project clusters. The cluster centers of the project clusters are updated as new data analysis projects are added such that the cluster centers represent an average value of the data analysis projects located within the project clusters. The clustering operation is based on the identified filters and filter levels stored within the vectors of the plurality of data analysis projects. The data analysis projects that include filters and filter levels that are the most similar are clustered together into a project cluster. In an example, the project clusters that include too few data analysis projects or a skewness value that is too high are discarded from further use by the searchable tag identifier module.

At block 210, the process 200 involves assigning searchable tags to project clusters. One or more processing devices execute the searchable tag identifier module 104 (or other suitable program code) to implement block 210. The searchable tag identifier module 104 assigns the searchable tags to each project cluster based on a majority filter represented in each of the project clusters. In an example, the majority filter represented in a project cluster is a filter that occurs the most at a most important filter level among all of the data analysis projects within the project cluster. In an example, the searchable tags are also assigned to the individual data analysis projects within the project clusters. The searchable tags are usable when a user submits a search query to a user interface associated with a term related to a data analysis project. Data analysis projects with searchable tags relevant to the search query are returned to the user as potentially related projects.

Figure 3:
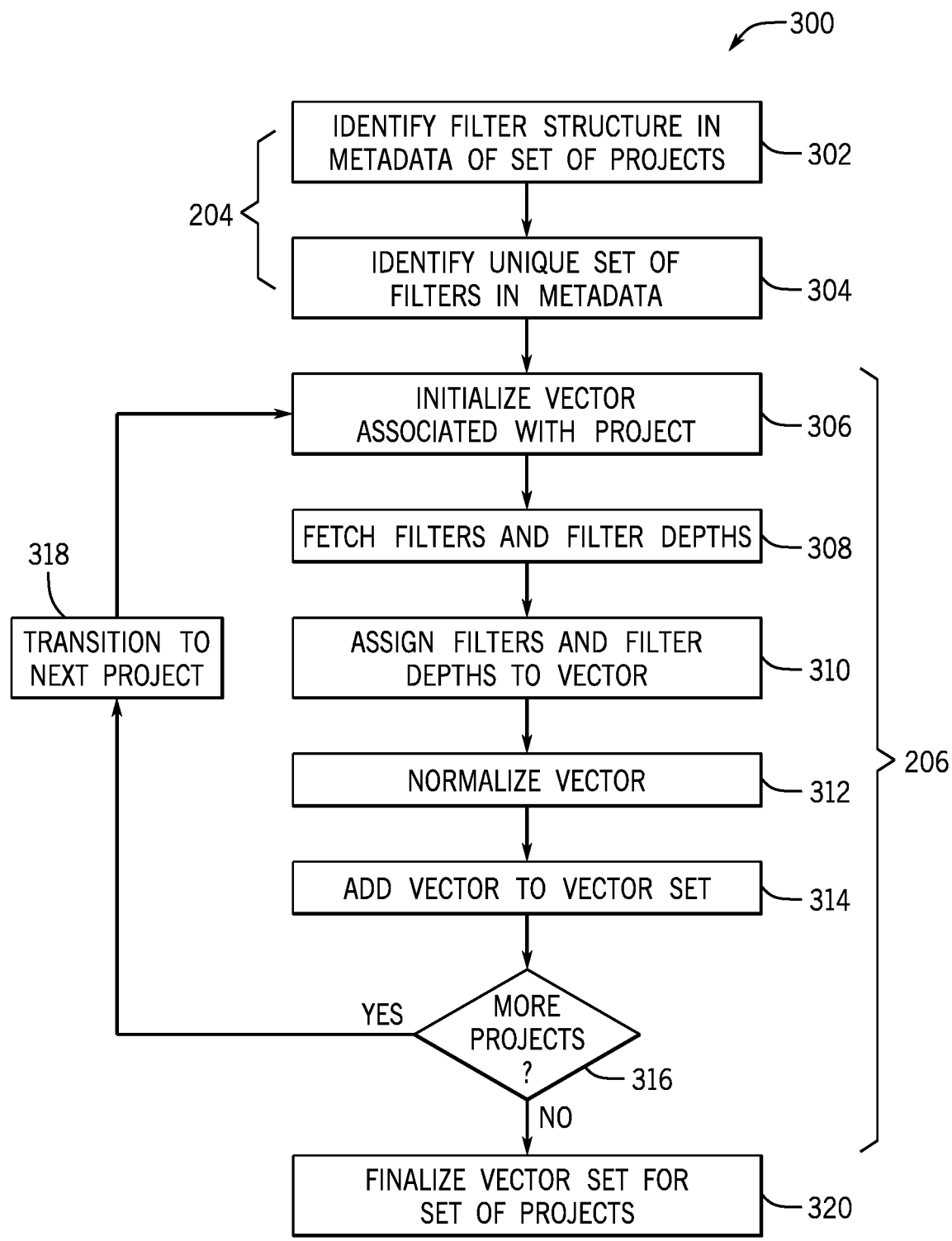
FIG. 3 depicts an example of a process for generating vector sets for a set of projects, according to certain embodiments of the present disclosure.

FIG. 3 depicts an example of a process 300 for generating vector sets for a set of data analysis projects. One or more processing devices implement operations depicted in FIG. 3 by executing suitable program code (e.g., the searchable tag identifier module 104). For illustrative purposes, the process 300 is described with reference to certain examples depicted in the figures. Other implementations, however, are possible.

Blocks 302 and 304 describe a mechanism to identify a set of filters within the project metadata 102, as described above with respect to block 204 of the process 200. At block 302, the process 300 involves identifying the filter structure in the project metadata 102 of the set of data analysis projects (e.g., the corpus of data analysis projects). One or more processing devices execute the metadata filter identifier 106 of the searchable tag identifier module 104 (or suitable other program code) to implement block 302. For instance, the metadata filter identifier 106 uses an algorithm, such as a smart feature selection or other structure detection algorithm, to determine the structures within the project metadata 102 that represent the filters identified by the project metadata 102.

At block 304, the process 300 involves identifying a unique set of filters in the project metadata 102. One or more processing devices execute the metadata filter identifier 106 (or suitable other program code) to implement block 304. For instance, the metadata filter identifier 106 compares the project metadata 102 to the filter structures identified at block 302 to identify a set of unique filters located within the project metadata 102. In an example, a structure of each data analysis project within the set of data analysis projects associated with the project metadata 102 is scanned to obtain a bag of filters that are present in the set of data analysis projects. The bag of filters represents a set of unique filters present in the project metadata. In an example, each of the unique filters within the bag of filters is assigned a one hot encoded value or other encoded value that represents the unique filter.

Blocks 306-320 describe a mechanism to generate a set of vectors based on the identified filters of the project metadata 102, as described above with respect to block 206 of the process 200. At block 306, the process 300 involves initializing a vector associated with a data analysis project. One or more processing devices execute the vector engine 108 of the searchable tag identifier module 104 (or other suitable program code) to implement block 306. For instance, the vector engine 108 receives an indication that a vector should be generated for a new data analysis project, and the vector engine 108 initializes a memory space to store the vector associated with the new data analysis project.

At block 308, the process 300 involves fetching the filters and the filter depths (i.e., filter levels) associated with the new data analysis project. One or more processing devices execute the vector engine 108 (or other suitable program code) to implement block 308. For instance, the vector engine 108 requests the filters and filter levels associated with the new data analysis project and receives an indication of the filters and filter levels associated with the new data analysis project. The filters and the filter levels are represented by encoded data. For example, the one hot encoded values assigned to each of the unique filters in the filter bag are used to represent the specific filters used by the new data analysis project. Further, each of the filters provided to the vector engine 108 also includes an indication of the depth or level at which the filter is used by the new data analysis project.

An example of the filters and the filter depths or levels includes an analyst creating a report (e.g., a data analysis project) to analyze revenue and orders in an e-commerce environment. In the example, the report targets a specific location (e.g., the United States) and orders are analyzed over a "gender is female" filter. Accordingly, the report includes two applied filters—"location-US" at a top filter level in the report and "gender-female" at a filter level below the location filter. Because "location-US" is the top filter, the "location-US" filter contributes more in classifying the report. Because of this, the two filters are assigned different weights within the vector of the new data analysis project.

At block 310, the process 300 involves assigning the filters and the filter depths to the initialized vector associated with the new data analysis project. One or more processing devices execute the vector engine 108 (or other suitable program code) to implement block 310. For instance, the one hot encoded value of the filters used in the new data analysis project is provided to the vector associated with the new data analysis project. Additionally, the filter depth or level is also indicated in the vector. In an example, the indication of the filter depth or level is provided by scaling the value of the filter by an inverse of the filter depth. That is, the one hot encoded value for a filter at a second filter level is represented by a value of ½ instead of a first level value of 1. Likewise, a filter at a third filter level is represented by a value of ⅓. Other representations of the filter depth or level are also contemplated for use within the vectors.

At block 312, the process 300 involves normalizing the vector based on a number of filters assigned to the vector. One or more processing devices execute the vector engine 108 (or other suitable program code) to implement block 312. For instance, upon assignment of the filters and filter depths to the vector, the vector is divided by a total number of filters that are present within the vector (i.e., the total number of filters assigned to the vector). Normalizing the vector prevents the values indicated in the vector from over or under influencing project clustering of the clustering engine 110 due to a larger or smaller number of filters than other data analysis projects that are also being clustered by the clustering engine 110.

At block 314, the process 300 involves adding the vector to a vector set (e.g., a vector bag) associated with the project metadata 102. One or more processing devices execute the vector engine 108 (or other suitable program code) to implement block 314. For instance, the vector set includes each of the vectors associated with each of the data analysis projects represented in the project metadata 102. Once the filters and the filter depths associated with the new data analysis project are assigned within the associated vector, the vector is added to the vector set.

At block 316, the process 300 involves making a determination as to whether there are additional projects represented in the project metadata 102 that are not yet associated with a vector in the vector set. One or more processing devices execute the vector engine 108 (or other suitable program code) to implement block 316. For instance, the metadata filter identifier 106 scans the project metadata 102 for the data analysis projects and the filters associated with the data analysis projects. Each of the data analysis projects identified by the metadata filter identifier 106 has a vector generated and populated by the vector engine 108.

If the vector engine 108 identifies that there are additional data analysis projects that are not yet assigned a vector, then at block 318 the process 300 involves transitioning to the next project in the project metadata 102. One or more processing devices execute the vector engine 108 (or other suitable program code) to implement block 318. For instance, block 318 returns the process 300 to block 306 where a new vector associated with the next data analysis project is initialized.

Initializing and populating additional vectors and adding the additional vectors to the vector set (e.g., through blocks 306-314) is repeated until a determination is made at block 316 that all of the data analysis projects associated with the project metadata 102 have a vector in the vector set. At block 320, upon determining at block 316 that there are no additional data analysis projects to create vectors for, the process 300 involves finalizing the vector set for the set of data analysis projects associated with the project metadata 102. One or more processing devices execute the vector engine 108 (or other suitable program code) to implement block 320. For instance, the vector engine 108 finalizes the vector set and provides the vector set to the clustering engine 110 for further processing.

Figure 4:
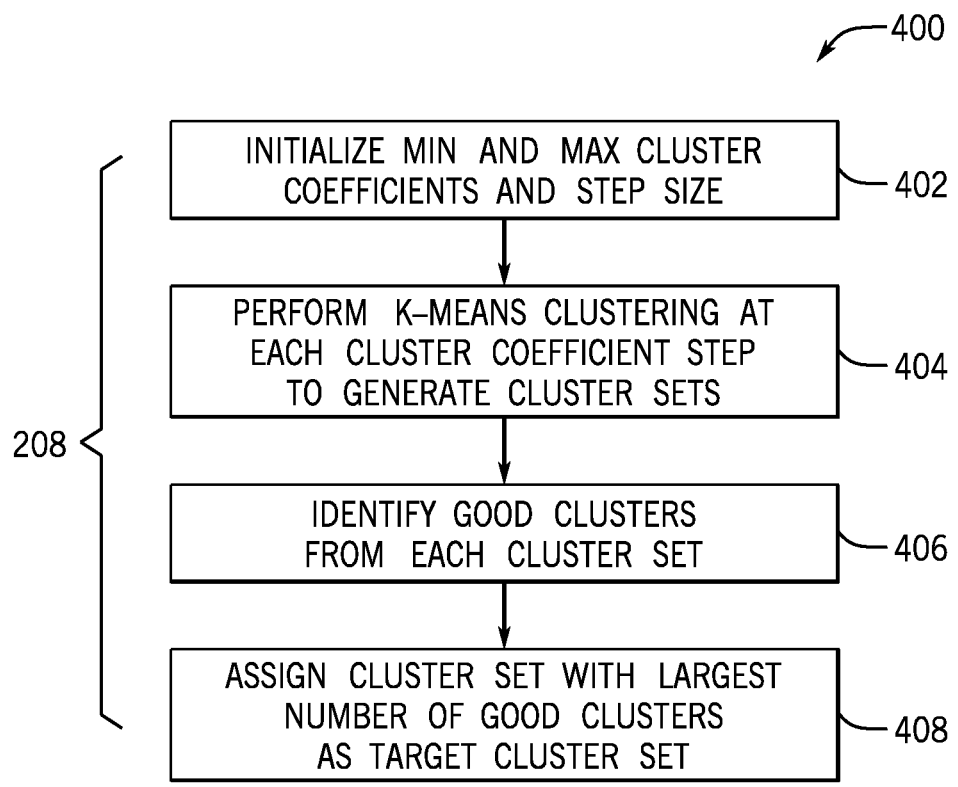
FIG. 4 depicts an example of a process for identifying a target cluster set from a group of cluster sets, according to certain embodiments of the present disclosure.

FIG. 4 depicts an example of a process 400 for identifying a target cluster set from a group of cluster sets associated with data analysis projects of the project metadata 102. One or more processing devices implement operations depicted in FIG. 4 by executing suitable program code (e.g., the searchable tag identifier module 104). For illustrative purposes, the process 400 is described with reference to certain examples depicted in the figures. Other implementations, however, are possible.

Blocks 402-408 describe a mechanism to cluster or group a set of vectors based on identified filters and filter levels, as described above with respect to block 208 of the process 200. At block 402, the process 400 involves initializing minimum and maximum cluster coefficients and a step size of a clustering operation. One or more processing devices execute the clustering engine 110 of the searchable tag identifier module 104 (or suitable other program code) to implement block 402. For instance, the k-means clustering operation is performed on the set of vectors generated at block 206 of the process 200 for each step between the minimum and maximum cluster coefficients. Further, the minimum and maximum cluster coefficients represent initial distances between centers of project clusters generated by the clustering operation. The smaller the cluster coefficient is, the closer the initial centers of the project clusters are and the greater the total number of project clusters generated for the vector set. The larger the cluster coefficient is, the further apart the initial centers of the project clusters are and the fewer the total number of project clusters generated for the vector set. The initialized step size determines a total number of clustering operations performed on the vector set. For example, a minimum cluster coefficient of 0.1 combined with a maximum cluster coefficient of 0.4 and a step size of 0.1 would generate 4 clustering operations that generate 4 separate sets of project clusters based on the vector set.

At block 404, the process 400 involves performing k-means clustering on each cluster coefficient step to generate the cluster sets. One or more processing devices execute the clustering engine 110 (or suitable other program code) to implement block 404. Continuing with the example above, the 4 clustering operations are performed on the vector set with cluster coefficients between 0.1 and 0.4 when the step size is 0.1. Such coefficient values and step sizes are used for illustrative purposes, and other cluster coefficient values and step sizes are also contemplated.

The k-means clustering operation groups the vectors of the vector set associated with the project metadata 102 into project clusters. For example, each of the vectors are compared to values associated with project cluster centers (e.g., an average value of the project cluster), and the vectors are assigned to the project cluster with a center closest in value to the vector. In this manner, the data analysis projects, by way of the associated vector value, are assigned to project clusters along with other data analysis projects that are identified as most similar based on distances of the vector values from the project cluster centers. This process is repeated for each coefficient step initialized at block 402 to generate separate cluster sets associated with each of the coefficient steps.

At block 406, the process 400 involves identifying good clusters (i.e., acceptable clusters) from each cluster set. One or more processing devices execute the clustering engine 110 (or suitable other program code) to implement block 406. For instance, as discussed in detail below with respect to FIG. 5, the clustering engine 110 removes project clusters from the cluster sets that include too few data analysis projects within the cluster, and the clustering engine 110 also removes project clusters from the cluster sets that include a skewness value that is too great. The result is cluster sets that only include "good clusters" that are acceptable for further analysis.

At block 408, the process 400 involves assigning the cluster set with a largest number of good clusters as a target cluster set. One or more processing devices execute the clustering engine 110 (or suitable other program code) to implement block 408. For instance, the clustering engine 110 analyzes a number of good clusters identified in each cluster set (i.e., each set of clusters identified for each clustering operation step). Based on this analysis, the clustering engine 110 assigns the target cluster set to the cluster set with the largest number of good clusters. The target cluster set is used at block 210 of the process 200 for the assignment of searchable tags to the clusters. Using the process 400, the clustering engine 110 is able to determine a cluster coefficient value that generates a largest number of relevant project clusters.

Figure 5:
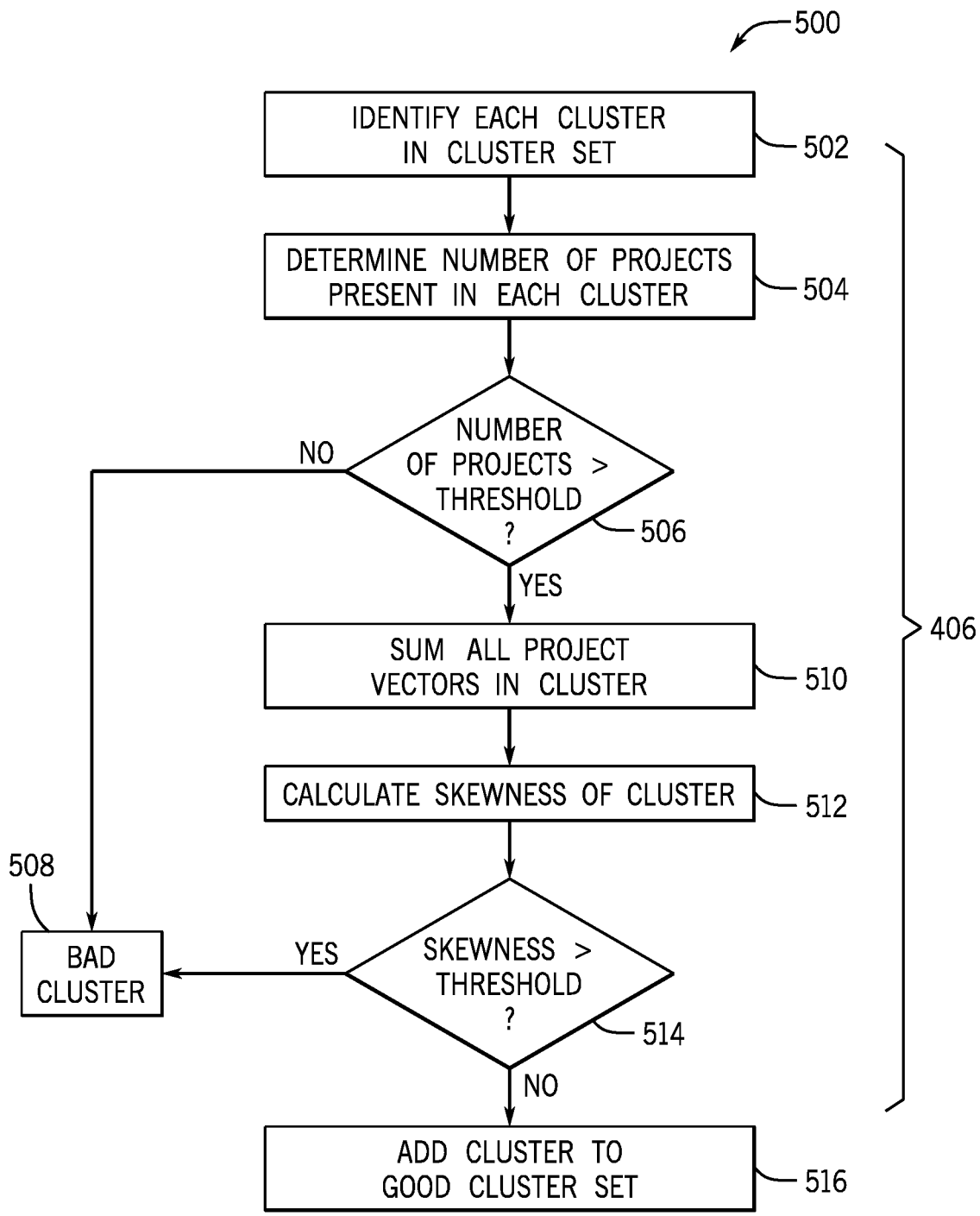
FIG. 5 depicts an example of a process for identifying good clusters from a cluster set, according to certain embodiments of the present disclosure.

FIG. 5 depicts an example of a process 500 for identifying good clusters from a cluster set. One or more processing devices implement operations depicted in FIG. 5 by executing suitable program code (e.g., the searchable tag identifier module 104). For illustrative purposes, the process 500 is described with reference to certain examples depicted in the figures. Other implementations, however, are possible.

Blocks 502-516 describe a mechanism to identify good project clusters from a cluster set, as described above with respect to block 406 of the process 400. At block 502, the process 500 involves identifying each project cluster in a cluster set. One or more processing devices execute the clustering engine 110 of the searchable tag identifier module 104 (or suitable other program code) to implement block 502. The clustering engine 110 is able to identify each of the project clusters of a cluster set to perform further analysis on each of the project clusters.

At block 504, the process 500 involves determining a number of data analysis projects present in each project cluster. One or more processing devices execute the clustering engine 110 (or suitable other program code) to implement block 504. For example, each of the project clusters includes a set of vectors and each of the vectors are associated with a data analysis project. The clustering engine 110 determines a number of data analysis projects grouped in a project cluster based on the set of vectors associated with the project cluster.

At block 506, the process 500 involves determining if a number of data analysis projects in each project cluster is greater than a threshold number of data analysis projects. One or more processing devices execute the clustering engine 110 (or suitable other program code) to implement block 506. In an example, the clustering engine 110 determines if a number of data analysis projects in each project cluster is greater than 4. If the number of data analysis projects is equal to or less than 4, the project cluster is discarded by the clustering engine 110 as a bad cluster at block 508. If the number of data analysis projects is greater than 4, the project cluster continues with the process 500. While a threshold of 4 is described, other threshold values are also contemplated. In one example, the threshold value increases or decreases based on a total number of data analysis projects represented in the project metadata 102. More data analysis projects represented by the project metadata 102 results in a larger threshold number, while fewer data analysis projects represented by the project metadata 102 results in a smaller threshold number.

At block 510, the process 500 involves summing all of the vectors in each project cluster. One or more processing devices execute the clustering engine 110 (or suitable other program code) to implement block 510. The sum of the vectors in each project cluster enables a skewness calculation associated with the project cluster.

At block 512, the process 500 involves calculating a skewness of the project cluster using the sum of the vectors within the project cluster. One or more processing devices execute the clustering engine 110 (or suitable other program code) to implement block 512. The skewness of the project cluster refers to a measure of asymmetry of the project cluster about the mean of the project cluster. In this manner, the skewness indicates if vectors making up the project cluster are generally too far from a cluster center of the project cluster to be sufficiently relevant to the other vectors located within the project cluster. For example, if the skewness value is high, a large number of vectors are located further from the center of the project cluster. Alternatively, if the skewness value is low, a large number of vectors are located in close proximity to the center of the project cluster. A project cluster with a large number of vectors located in close proximity to the center of the project cluster is more likely to include vectors associated with data analysis projects that have similar filtering schemes to each other. In an example, the following equation is used by the clustering engine 110 to calculate the skewness of the project cluster:

$$g = \frac{\sum_{i=1}^{n}(x_i - \bar{x})^3}{(n-1)s^3} \qquad \text{(Equation 1)}$$

where g is the skewness of the project cluster, n is the total number of data analysis projects in the project cluster, $x_i$ is the ith vector value, $\bar{x}$ is the average value of the set of vectors in the project cluster, and s is the standard deviation of all values.

At block 514, the process 500 involves a determination of whether the skewness of the project cluster is greater than a skewness threshold. One or more processing devices execute the clustering engine 110 (or suitable other program code) to implement block 514. The skewness threshold is set to a value that establishes that the skewness of the project cluster is either acceptable or unacceptable. In an example, the skewness threshold is set at 10, and any skewness value of a project cluster greater than 10 results in the project cluster being discarded by the clustering engine 110 as a bad cluster at block 508. Further, any skewness value of the project cluster that is 10 or less results in the project cluster being added to a good cluster set by the clustering engine 110 at block 516. While a skewness threshold of 10 is described, other threshold values are also contemplated.

Figure 6:
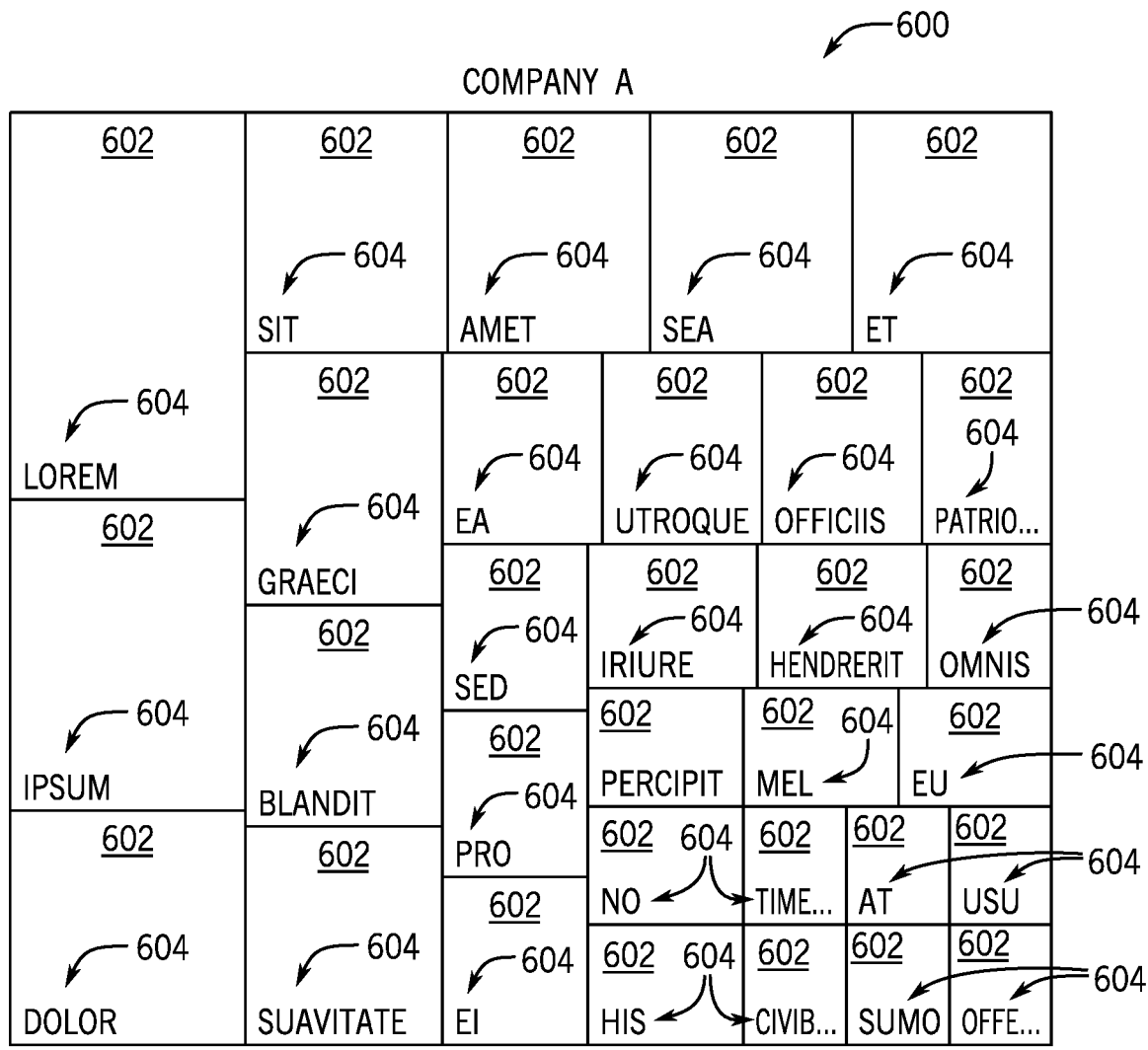
FIG. 6 depicts an example of a treemap of searchable tags corresponding to the tagged project clusters of FIG. 2, according to certain embodiments of the present disclosure.

FIG. 6 depicts an example of a treemap 600 of tagged project clusters 602. The treemap 600 includes the tagged project clusters 602 with searchable tags 604 assigned at block 210 of the process 200. For example, the tagged project clusters 602 each include the searchable tags 604 that correspond to a majority filter identified in each of the tagged project clusters 602.

In an example, the treemap 600 is formatted such that a larger size of a tagged project cluster 602 indicates more data analysis projects associated with the tagged project cluster 602. Using the treemap 600 a company is able to quickly identify primary focuses of the data analysis projects. Upon identifying the primary focuses, the company is able to adjust data analysis focuses to important but underrepresented projects.

In an example, the project cluster 602 represented by the searchable tag 604 labeled as "LOREM" indicates that the data analysis projects related to LOREM are overrepresented based on how important the searchable tag LOREM is to Company A. Likewise, the project cluster 602 represented by the searchable tag 604 labeled "USU" indicates that the data analysis projects related to USU are underrepresented based on how important the searchable tag USU is to company A. While LOREM and USU are the largest and smallest project clusters 602, respectively, in another example, the LOREM and USU project clusters 602 accurately represent the importance of the respective searchable tags 604. In such an example, other data analysis project focuses are adjustable based on the visual of the treemap 600.

Example of a Computing System for Executing a Searchable Tag Identifier Module

Figure 7:
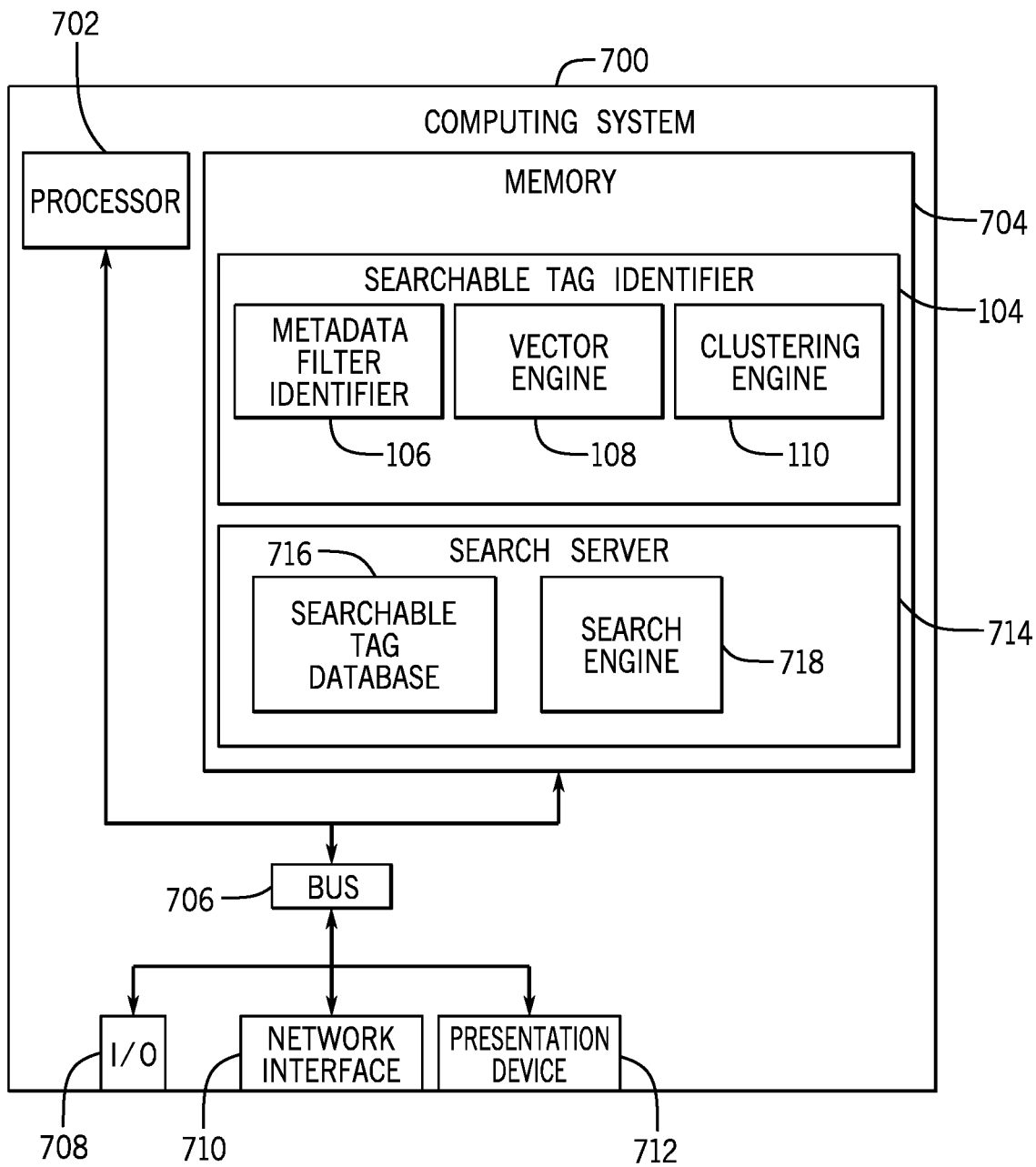
FIG. 7 depicts an example of a computing system for performing various operations described herein, according to certain embodiments of the present disclosure.

Any suitable computing system or group of computing systems can be used for performing the operations described herein. FIG. 7 depicts an example of a computing system 700 for performing various operations described herein, according to certain embodiments of the present disclosure. In some embodiments, the computing system 700 executes the searchable tag identifier module 104, as depicted in FIG. 7. In other embodiments, separate computing systems having devices similar to those depicted in FIG. 7 (e.g., a processor, a memory, etc.) separately execute the searchable tag identifier module 104.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the searchable tag identifier module 104, the metadata filter identifier 106, the vector engine 108, the clustering engine 110, or other suitable applications that perform one or more operations described herein. The program code may be resident in the memory device 704 or any suitable computer-readable medium and may be executed by the processor 702 or any other suitable processor. In additional or alternative embodiments, the program code described above is stored in one or more other memory devices accessible via a data network.

Also included in the memory device 704 is a search server 714. In an example, the search server 714 includes a searchable tag database 716 and a search engine 718. When the searchable tag identifier module 104 generates searchable tags for project clusters, the searchable tags are provided to the searchable tag database 716 for storage. When the search engine 718 receives a query from a user, the search server 714 enables the querying of the searchable tag database 716 for searchable tags relevant to the query. In an example, the relevant searchable tags, and their accompanying data analysis projects, are returned to the user at the search engine 718 as results of the query.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing an searchable tag identifier module 104) via a data network using the network interface device 710.

In some embodiments, the computing system 700 also includes the presentation device 712. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing system 700 using one or more data networks described herein. Other aspects can omit the presentation device 712.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for augmenting project data with searchable metadata for facilitating project queries, wherein the method includes one or more processing devices performing operations comprising:
   receiving, at a searchable tag identifier module, metadata of a set of projects, wherein a project of the set of projects comprises a filtered set of data that is generated by applying a set of filters to a set of data;
   identifying, by a metadata filter identifier, a filter of the set of filters within the metadata;
   generating, by a vector engine, (i) a first vector representing a first project of the set of projects, wherein the first vector comprises a first set of filters used in the first project and a respective filter level associated with each of the first set of filters that defines an ordered position of the respective filter level in the first set of filters, and (ii) a second vector representing a second project of the set of projects, wherein the second vector comprises a second set of filters used in the second project and a respective filter level associated with each of the second set of filters that defines an ordered position of the respective filter level in the second set of filters;
   grouping, by a clustering engine, the first vector and the second vector into a project cluster based on the first vector and the second vector being within a threshold distance, wherein the project cluster represents a subset of filters from the first set of filters and the second set of filters, wherein the subset of filters includes the filter, and wherein the subset of filters is associated with a subset of projects; and
   assigning, by the searchable tag identifier module, a searchable tag to the project cluster based on the filter being a majority filter represented in the project cluster, wherein the searchable tag comprises metadata that facilitates locating one or more of the first project and the second project responsive to a query to the set of projects.

2. The method of claim 1, comprising:
   identifying a filter structure of the metadata, wherein the filter is identified based on the filter structure.

3. The method of claim 1, comprising:
   identifying the project cluster as belonging to a set of acceptable clusters or as belonging to a set of unacceptable clusters based on a number of projects grouped in the project cluster and a skewness of the project cluster; and
   assigning the searchable tag to the project cluster upon identifying the project cluster as belonging to the set of acceptable clusters.

4. The method of claim 3, wherein the skewness of the project cluster is based on an average of values in a cumulative vector of the project cluster, values associated with each project in the project cluster, a vector length of the cumulative vector, and a standard deviation of the values associated with each project in the project cluster.

5. The method of claim 1, wherein grouping the first vector and the second vector comprises performing a k-means operation on a set of vectors, and wherein each vector of the set of vectors is associated with an individual project of the set of projects.

6. The method of claim 5, wherein the k-means operation is performed using a plurality of clustering coefficients to generate a plurality of intermediate cluster sets, and a plurality of project clusters including the project cluster is identified based on a target intermediate cluster set of the plurality of intermediate cluster sets comprising a largest number of acceptable clusters.

7. The method of claim 1, comprising:
   displaying the project cluster with the searchable tag in a treemapping visualization.

8. A computing system comprising:
   a processor; and
   a non-transitory computer-readable medium comprising instructions that are executable by the processor to cause the processor to perform operations comprising:
      receiving metadata of a set of projects, wherein a project of the set of projects comprises a filtered set of data that is generated by applying a set of filters to a set of data;
      identifying a filter of the set of filters within the metadata;
      generating (i) a first vector representing a first project of the set of projects, wherein the first vector comprises a first set of filters used in the first project and a respective filter level associated with each of the first set of filters that defines an ordered position of the respective filter level in the first set of filters, and (ii) a second vector representing a second project of the set of projects, wherein the second vector comprises a second set of filters used in the second project and a respective filter level associated with each of the second set of filters that defines an ordered position of the respective filter level in the second set of filters;
      grouping the first vector and the second vector into a project cluster based on the first vector and the second vector being within a threshold distance, wherein the project cluster represents a subset of filters from the first set of filters and the second set of filters, wherein the subset of filters includes the filter, and wherein the subset of filters is associated with a subset of projects; and assigning a searchable tag to the project cluster based on the filter being a majority filter represented in the project cluster, wherein the searchable tag comprises metadata that facilitates locating one or more of the first project and the second project responsive to a query to the set of projects.

9. The computing system of claim 8, wherein the operations further comprise:
identifying a filter structure of the metadata, wherein the filter is identified based on the filter structure.

10. The computing system of claim 8, wherein the operations further comprise:
identifying the project cluster as belonging to a set of acceptable clusters or as belonging to a set of unacceptable clusters based on a number of projects grouped in the project cluster and a skewness of the project cluster; and
assigning the searchable tag to the project cluster upon identifying the project cluster as belonging to the set of acceptable clusters.

11. The computing system of claim 10, wherein the skewness of the project cluster is based on an average of values in a cumulative vector of the project cluster, values associated with each project in the project cluster, a vector length of the cumulative vector, and a standard deviation of the values associated with each project in the project cluster.

12. The computing system of claim 8, wherein grouping the first vector and the second vector comprises performing a k-means operation on a set of vectors, and wherein each vector of the set of vectors is associated with an individual project of the set of projects.

13. The computing system of claim 12, wherein the k-means operation is performed using a plurality of clustering coefficients to generate a plurality of intermediate cluster sets, and a plurality of project clusters including the project cluster is identified based on a target intermediate cluster set of the plurality of intermediate cluster sets comprising a largest number of acceptable clusters.

14. A non-transitory computer-readable medium having instructions stored thereon, the instructions executable by a processing device to perform operations comprising:
receiving metadata of a set of projects, wherein a project of the set of projects comprises a filtered set of data that is generated by applying a set of filters to a set of data;
identifying a filter of the set of filters within the metadata;
generating (i) a first vector representing a first project of the set of projects, wherein the first vector comprises a first set of filters used in the first project and a respective filter level associated with each of the first set of filters that defines an ordered position of the respective filter level in the first set of filters; and (ii) a second vector representing a second project of the set of projects, wherein the second vector comprises a second set of filters used in the second project and a respective filter level associated with each of the second set of filters that defines an ordered position of the respective filter level in the second set of filters;
grouping the first vector and the second vector into a project cluster based on the first vector and the second vector being within a threshold distance, wherein the project cluster represents a subset of filters from the first set of filters and the second set of filters, wherein the subset of filters includes the filter, and wherein the subset of filters is associated with a subset of projects; and
assigning a searchable tag to the project cluster based on the filter being a majority filter represented in the project cluster, wherein the searchable tag comprises metadata that facilitates locating one or more of the first project and the second project responsive to a query to the set of projects.

15. The non-transitory computer-readable medium of claim 14, the instructions further executable by the processing device to perform operations comprising:
identifying a filter structure of the metadata, wherein the filter is identified based on the filter structure.

16. The non-transitory computer-readable medium of claim 14, the instructions further executable by the processing device to perform operations comprising:
identifying the project cluster as belonging to a set of acceptable clusters or as belonging to a set of unacceptable clusters based on a number of projects grouped in the project cluster and a skewness of the project cluster; and
assigning the searchable tag to the project cluster upon identifying the project cluster as belonging to the set of acceptable clusters.

17. The non-transitory computer-readable medium of claim 16, wherein the skewness of the project cluster is based on an average of values in a cumulative vector of the project cluster, values associated with each project in the project cluster, a vector length of the cumulative vector, and a standard deviation of the values associated with each project in the project cluster.

18. The non-transitory computer-readable medium of claim 14, the instructions further executable by the processing device to perform operations comprising:
displaying the project cluster with the searchable tag in a treemapping visualization.

* * * * *